Feb. 24, 1970   J. W. HENNEMAN   3,496,954
ALTITUDE SENSING DEVICE
Filed July 20, 1967   2 Sheets-Sheet 1

INVENTOR
JOHN W. HENNEMAN
ATTORNEY

INVENTOR
JOHN W. HENNEMAN

BY James L. O'Brien

ATTORNEY

United States Patent Office 3,496,954
Patented Feb. 24, 1970

3,496,954
ALTITUDE SENSING DEVICE
John W. Henneman, Rock Island, Ill., assignor to The Bendix Corporation, a corporation of Delaware
Filed July 20, 1967, Ser. No. 654,759
Int. Cl. A62b 7/14; F16k 17/36
U.S. Cl. 137—81                                7 Claims

ABSTRACT OF THE DISCLOSURE

An altitude sensing device having three restricting orifices arranged in series, the first orifice being connected to a supply of pressurized gas, a spring loaded valve between the first and second orifices communicating with ambient pressure, and a gage pressure output between the second and third orifices. Further disclosed is an oxygen regulator for a breathing mask of an aircraft occupant including an altitude sensing device of the above construction for providing breathing oxygen at a preselected pressure schedule.

BACKGROUND OF THE INVENTION

Field of the invention

Altitude sensing devices particularly suited for use in oxygen regulators for a breathing mask of an aircraft occupant.

Description of the prior art

Oxygen regulators of the type herein described have previously used aneroids to regulate the flow and pressure of oxygen delivered to a breathing mask of an aircraft occupant as a function of altitude. The use of an aneroid in a life supporting device such as an oxygen regulator is not deemed desirable since aneroids are fragile and deteriorate with age even when not in use.

SUMMARY OF THE INVENTION

The present invention provides an altitude sensing device through a novel arrangement of three restricting orifices and a spring loaded valve. More particularly, the three restricting orifices are placed in series with an inlet at one end of the series arrangement and an outlet at the other end. A valve, resiliently urged toward the closed position by a substantially constant force, is disposed between the first and second orifices. The gage pressure between the second and third orifices, i.e. the amount that the pressure between the second and third orifices exceeds ambient pressure, is used as the output of the altitude sensing device. It is preferred that the third orifice have a sharp downstream edge and that an inlet supply pressure be used which is sufficient to cause sonic flow through the three orifices.

DETAILED DESCRIPTION OF THE PREFERRED EMBODIMENTS

Description of the altitude sensing device

Figure 1:
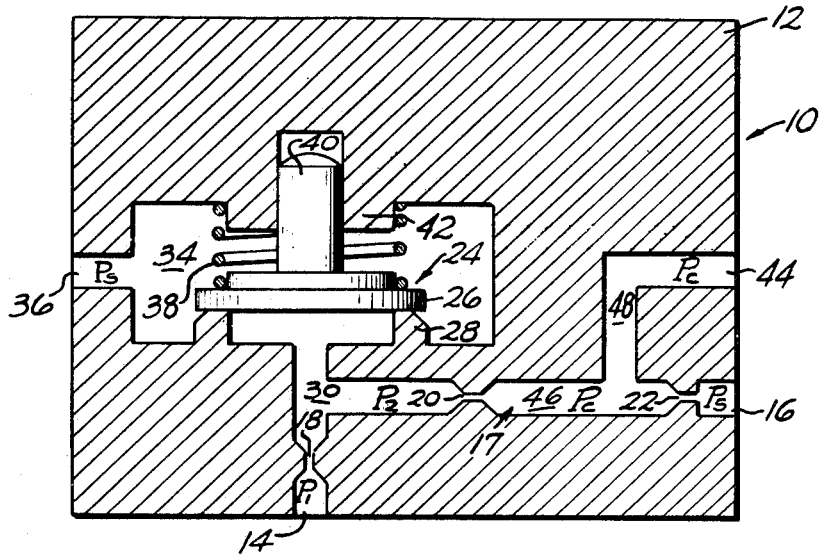
FIGURE 1 is a schematic illustration of the altitude sensing device of this invention.

An altitude sensing device 10 is shown in FIG. 1 having a body 12 with an inlet opening 14 which is adapted to be connected to a supply of pressurized gas. The body 12 is also provided with an outlet opening 16 which communicates with ambient pressure. A flow passage 17 in the body 12 extends between the inlet 14 and the outlet 16 and restriction orifices 18, 20 and 22 are arranged in series in the passage 17. A valve 24 having a valve member 26 and a valve seat 28 communicates at its inlet end with a portion 30 of passage 17 between the first orifice 18 and the second orifice 20. The outlet end of the valve 24 communicates with a valve chamber 34 which in turn communicates with ambient pressure through a passage 36. The valve member 26 is resiliently urged towards the closed position by a spring member 38. The valve 24 is provided with a stem 40 which is in slideable engagement with a valve support 42 to permit opening and closing motion of the valve member 26 with respect to the valve seat 28. The body 12 is also provided with a control pressure opening 44 which communicates with a portion 46 of the passage 17 between the second orifice 20 and the third orifice 22 via passageway 48 and which is adapted to be connected to a device responsive to gage pressure such as a dynamic seal, namely, a diaphragm, a piston, or the like.

Operation of the altitude sensing device

Figure 2:
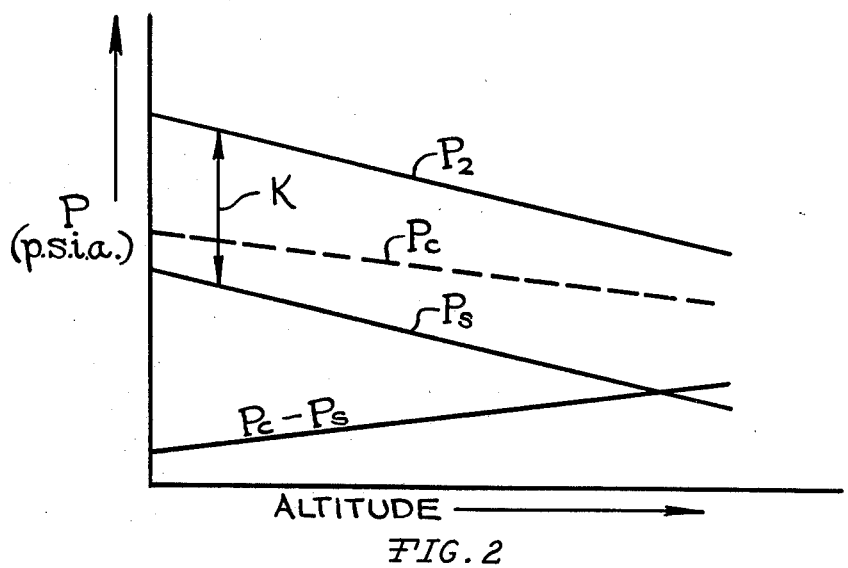
FIGURE 2 is a chart which shows the pressure vs. altitude parameters of the device of FIG. 1.

The operation of the device 10 can be better understood by referring to the chart of FIG. 2 as well as the schematic representation in FIG. 1. An inlet pressure, hereinafter sometimes referred to as $P_1$, is provided at the inlet opening 14. The dimensions of the orifices 18, 20 and 22, the valve 24, and the spring rate of the spring member 38 are adjusted so that a part of the inlet flow is metered through the valve 24 and the other part through the orifices 20 and 22. As can be seen in FIG. 1, the pressure between the first orifice 18 and the second orifice 20, hereinafter sometimes referred to as $P_2$, depends upon the inlet pressure $P_1$, the influence of valve 24, and the flow resistances of the orifices 20 and 22. However, the flow resistances of the orifices 20 and 22 are preselected such that the predominant influence on the pressure $P_2$ is the valve 24. Furthermore, the valve 24 is designed such that the travel of the valve member 26 with respect to the valve seat 28 is small so that the force exerted by the spring member 38 against the valve member 26 is substantially constant. Because this force is substantially constant, the pressure drop across valve 24 will be substantially constant. As a result, the pressure $P_2$ will differ from the ambient pressure, hereinafter sometimes referred to as $P_s$, by a substantially fixed amount. This condition is shown in the chart of FIG. 2 wherein a plot of pressure $P_2$ substantially parallels a plot of the pressure $P_s$, both of which decline as altitude increases and are separated by a substantially constant pressure differential designated as K. In practice, the value of K has been found to vary by approximately 1% of the value of the pressure $P_2$.

The pressure between the second orifice 20 and the third orifice 22, hereinafter sometimes referred to as $P_c$, depends upon the pressure $P_2$, the flow resistance of the orifices 20 and 22, and the pressure $P_s$. As will be understood by one skilled in the art, the magnitude of the pressure $P_c$ is always less than the pressure $P_2$, due to the pressure drop across orifice 20, and greater than the pressure $P_s$ when flow is maintained from inlet 14 through outlet 16. This relationship is shown in the chart of FIG.

2 wherein the plot of the pressure $P_c$ is wholly between the plots of the pressure $P_2$ and the pressure $P_s$.

Unlike the pressure drop across the valve 24, the pressure drop across the orifice 20 is not constant, but varies as a function of $P_s$ in a manner such that a pressure differential between the pressure $P_c$ and the pressure $P_s$, i.e. gage pressure $P_c$, increases as altitude increases over the operating range of this device. This relationship can be seen as the plot $P_c$–$P_s$ in FIG. 2, which plot represents the arithmetical subtraction of the plot of the pressure $P_s$ from the plot of the pressure $P_c$. As can be seen from FIG. 1, the pressure $P_c$ is available at the control pressure opening 44 and may be used to operate a dynamic seal in an oxygen regulator by transmitting the pressure $P_c$ to one side of the dynamic seal and having the other side of the dynamic seal communicating with the ambient pressure $P_s$.

To provide a maximum pressure differential $P_c$–$P_s$, it is preferred to make the third orifice 22 a sharp edged orifice as shown in FIG. 1 and to use an inlet pressure $P_1$ which is sufficient to cause sonic flow through the third orifice 22. In this manner, a limiting flow through the third orifice 22 is reached which prevents the pressure downstream of the third orifice 22 from influencing the pressure $P_c$. Thus, $P_c$ will be a function of the pressure $P_2$ and the flow resistance of the second orifice 20 exclusively. Nevertheless, the differential pressure $P_c$–$P_s$ will remain a function of altitude as shown in FIG. 2 since the pressure $P_2$ varies as a function of altitude. However, the magnitude of the pressure differential $P_c$–$P_s$ will be greater since the pressure $P_s$ downstream of the third orifice 22 does not exert a lowering influence on the value of the pressure $P_c$. Furthermore, this arrangement is useful when the outlet of the orifice 22 does not communicate directly with ambient pressure in which case it is generally desirable to effectively isolate the conditions downstream of the third orifice 22 from the pressure $P_c$.

Description of the oxygen regulator

Figure 3:
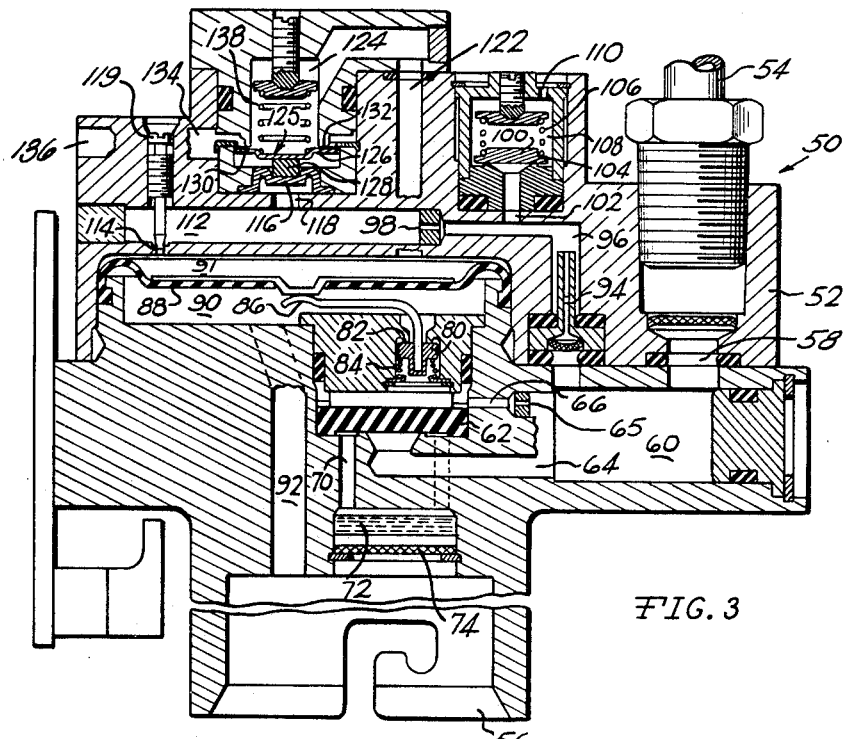
FIGURE 3 is a schematic illustration of an oxygen regulator incorporating the altitude sensing device of this invention showing the regulator components in the position which they assume below a preselected altitude to provide oxygen at substantially ambient pressure to the breathing mask.
Figure 4:
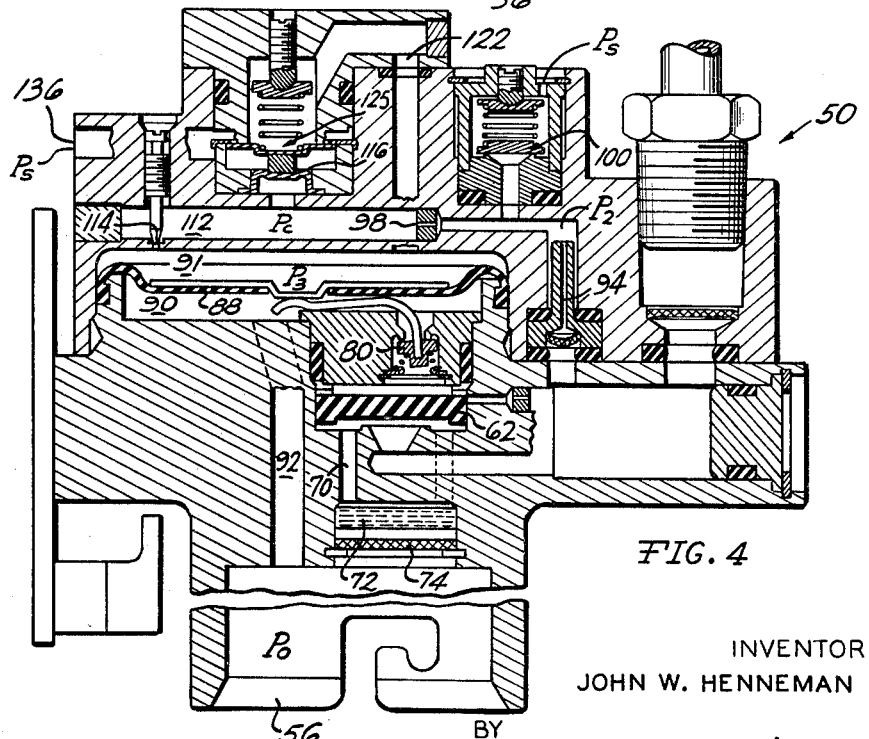
FIGURE 4 is a schematic illustration like FIG. 2 showing the regulator components in the positions which they assume above a preselected altitude to provide oxygen under pressure to the breathing mask.

In FIGS. 3 and 4, an oxygen regulator 50 incorporating the altitude sensing device of this invention is shown. The oxygen regulator 50 is provided with a body 52 having an oxygen inlet fitting 54 attached thereto and having a main regulator outlet 56 which is adapted to be connected to the breathing mask of an aircraft occupant. The oxygen inlet fitting 54 communicates through an inlet passage 58 with the inlet chamber 60. The inlet chamber 60 in turn communicates with the lower side of a main valve member 62 through the main valve inlet passage 64 and with the upper side of the main valve member 62 through a pilot valve orifice 65 disposed in a pilot valve passage 66. The main valve member 62 is resiliently biased toward the closed position by an effect of inlet pressure. A plurality of outlet passages 70 are provided which communicate with the main valve member 62 and with the regulator outlet 56 through a noise suppressing element 72 and a filter 74. The main valve member 62 closes the path between the main valve inlet passage 64 and the outlet passages 70 when the valve 62 is in its closed position (FIG. 3). A pilot valve member 80 communicates on one side with the pilot valve passage 66 and on the other side and with a chamber 90 on one side of a diaphragm 88, which constitutes a dynamic seal. The pilot valve member 80 is urged toward a pilot valve seat 82 by a resilient force applied by a pilot valve spring 84. A lever 86 on the valve member extends into the chamber 90 into engagement with a portion of the diaphragm 88 which provides an air-tight seal between the chamber 90 and a chamber 91 on the opposite side of the diaphragm 88. The chamber 90 communicates with the outlet 56 through a diaphragm chamber outlet passage 92.

The oxygen regulator 50 is also provided with a first orifice 94 having an inlet communicating with the inlet chamber 60. The outlet of the orifice 94 communicates through a passage 96 with a second orifice 98, and in addition, communicates with a valve member 100 through a valve passage 102. The valve member 100 is urged towards its seat 104 by a spring member 106 and is disposed in a cavity 108 having an outlet opening 110 to ambient. The second orifice 98 communicates at its outlet end with a control pressure chamber 112 which in turn communicates with a third orifice 114 and the lower portion of a dynamic seal 116, which in the illustrated embodiment is a diaphragm, through a seal passage 118. To allow for convenient calibration of the altitude sensing device, the flow resistance of the third orifice 114 is adjustable by turning the threaded needle member 119. The outlet of the third orifice 114 communicates with the diaphragm chamber 91 which is provided with a passageway 122 to an exhaust valve chamber 124. An exhaust valve 125 in the chamber 124 includes a valve member 126 connected by a valve stem 128 to the diaphragm 116 in a manner such that the member 126 is resiliently movable toward and away from an exhaust valve seat 130 formed in the body 52. The exhaust valve seat 130 is provided with a plurality of openings 132 which communicate through an exhaust passage 134 to an exhaust outlet opening 136. The exhaust valve member 126 is resiliently biased toward the open position by an exhaust valve spring member 138. Thus, as the pressure in control chamber 112 increases the diaphragm 116 is urged toward a position closing valve 125.

Operation of the oxygen regulator

In the use of the regulator 50, a supply of oxyen under pressure is connected to the inlet fitting 54, so that oxygen passes through the inlet passage 58 into the inlet chamber 60. A portion of the oxygen is transmitted through the main valve inlet passage 64 and acts upon the main valve member 62 in a direction to unseat it. Another portion of the oxygen passes through the pilot valve restriction 65 and pilot valve inlet passage 66 tending to seat the main valve member 62 so that the pressures on opposite sides thereof are equal. The inlet pressure acts upon the main valve member 62 to resiliently hold it in the closed position.

When a demand is made by the regulator user, a suction is created in the main outlet 56 of the regulator. This suction is transmitted through the diaphragm outlet passageway 92 to the diaphragm chamber 90. When the regulator 50 is at an altitude such that exhaust valve 125 is open, as shown in FIG. 3, the diaphragm chamber 91 communicates with the ambient atmosphere through the exhaust valve inlet passage 122, the exhaust valve chamber 124, the exhaust valve outlet passage 134 and the exhaust valve outlet opening 136. As a result, the suction in the diaphragm chamber 90 creates a pressure differential across the diaphragm 88 which causes the diaphragm 88 to move to the position shown in FIG. 4 and thus act upon the pilot valve lever 86 to tip open the pilot valve member 80.

As soon as the pilot valve member 80 opens, a pilot flow of oxygen passes through the pilot valve orifice 65, the pilot valve passageway 66, the pilot valve 80, the diaphragm chamber 90 and the diaphragm outlet passageway 92 to the regulator main outlet 56. This pilot flow of oxygen through the pilot valve orifice 65 creates a pressure differential across the main valve member 62 which causes an unseating movement of main valve member 62 to provide for a principal flow of oxygen from the main valve inlet passage 64, through the main valve and the main valve outlet passages 70, to the regulator main outlet 56. It can thus be seen that a suction demand at the regulator main outlet 56 will cause a flow of oxygen to the main outlet 56, the principal portion of which is through the main valve outlet passages 70. This supply of oxygen in response to suction demand takes place at lower altitudes where the pressure of the ambient atmosphere is of a sufficient magnitude to keep exhaust valve 125 open. At higher altitudes the restricting orifices 94, 98 and 114 function like the orifices 18, 20 and 22, respectively, in the sensing device 10 to sense altitude and provide for an oxygen pressure at outlet 56, as hereinafter described.

A portion of the oxygen admitted to inlet chamber 60 also passes through the first orifice 94, the passage 96, the second orifice 98, the control pressure chamber 112, the third orifice 114, the diaphragm chamber 91, the exhaust valve inlet passage 122, the exhaust valve chamber 124, the exhaust valve outlet passage 134 and the exhaust valve outlet opening 136. As the ambient pressure decreases, the pressure $P_2$ between the first orifice 94 and the second orifice 98 decreases at the same rate as the ambient pressure $P_s$, but $P_2$ is always greater than $P_s$ by an amount proportional to the magnitude of the force exerted on valve member 100 by valve spring member 106. Valve member 100 moves only small distances so that the force exerted thereon by spring 106 is a constant.

The pressure $P_c$ between the second orifice 98 and the third orifice 114 also decreases as a function of ambient pressure $P_s$, but not as rapidly as pressure $P_s$, as previously explained in connection with device 10. Thus it can be seen that an increasing pressure differential between the pressure $P_c$ and ambient pressure occurs as the altitude increases.

The pressure downstream of the third orifice 114, indicated as $P_3$, is substantially the same as ambient pressure $P_s$ when exhaust valve member 126 is in the open position. Therefore a pressure differential between the pressure $P_c$ and $P_3$ exists when the exhaust valve member 126 is in the open position, which differential is approximately equal to the pressure differential $P_c-P_s$. The pressure differential $P_c-P_3$ is across the dynamic seal 116 and acts through the exhaust valve stem 128 upon the exhaust valve member 126 to urge it towards the closed position. As the exhaust valve member 126 moves toward the closed position, pressure $P_3$ in the diaphragm chamber 91 increases. This increase in $P_3$ results in a pressure differential across the diaphragm 88 causing the diaphragm 88 to flex in a direction to open pilot valve 80, and main valve 62, as shown in FIG. 4, resulting in oxygen flow through passages 70 and 92 to the outlet 56, as previously described. This flow continues until the pressure at outlet 56, indicated at $P_0$, is substantially equal to $P_3$ causing return of diaphragm 88 to its FIG. 3 position, in which position $P_0$ and $P_3$ are about equal. A pressure $P_0$ is thus maintained on the lungs of the user of regulator 50, with $P_0$ being substantially equal to $P_3$. When the exhaust valve 125 is moved by diaphragm 116 to a metering position to cause an increase in $P_3$, the valve 125 throttles between open and closed positions at a given altitude to maintain a fixed pressure $P_3$ at that altitude. Since $P_c-P_s$ increases as altitutde increases, $P_3$ also increases proportionately as altitude increases to thereby maintain an outlet pressure $P_0$ which is increased as altitude is increased. The flow restriction at the third orifice 114 can be adjusted by turning a threaded needle member 119 to establish a pressure schedule for $P_0$ which will meet physiological requirements.

In the embodiment of the present invention shown in FIGS. 3 and 4, it is preferred that the third orifice 114 be a sharp edge orifice and the supply pressure be great enough to cause sonic flow through the third orifice 114. This is preferred since sonic flow through the sharp edge orifice limits the flow rate through the orifice to a particular value regardless of the pressure downstream of the orifice. Therefore, as in this case, pressure conditions downstream of the third orifice 114 may change without adversely affecting the calibration of the altitude sensing operation.

The present invention is an important advancement in altitude sensing devices since it does not require the use of an aneroid. It is thus not affected by minute leaks which destroy the vacuum in an aneroid and functions only when in operation whereas an evacuated aneroid is constantly exposed to a pressure differential. It has an unlimited storage life and may be used for extended periods without re-calibration. The gage pressure output of the device is particularly suited for operation of dynamic seals as found in oxygen regulators and countless other devices.

What is claimed is:

1. An altitude sensing device comprising a body having an inlet, means forming a passage in said body communicating at one end with said inlet, first, second and third restricting orifices in series arrangement in said passage and arranged in sequence in a direction extending from said inlet, means forming an opening in said body communicating the portion of said passage between said first and second orifices with the ambient atmosphere, valve means at said opening for metering flow from said passage portion through said opening, means subjecting said valve means to a substantially constant closing force, said body having an exhaust opening downstream from said third orifice communicating with the ambient atmosphere, whereby on connection of said inlet to a gas supply at elevated pressure sufficient to maintain sonic flow through said restrictions, the difference between a control pressure existing between said second and third orifices and ambient pressure will increase as the ambient pressure decreases, an exhaust valve member located between said third orifice and said exhaust opening for metering flow therebetween, said exhaust valve member being exposed on one side to the pressure downstream from said third orifice and being positioned so that a force on the opposite side thereof tends to move said exhaust valve member in a direction to close said exhaust opening, and dynamic seal means exposed to said control pressure and operatively associated with said opposite side of said valve member so as to move said valve member toward the closed position therefor so that as the difference between said control pressure and ambient pressure increases, said pressure downstream from said third orifice is proportionally increased.

2. The device according to claim 1 wherein said body is also provided with a main outlet adapted to be connected to the breathing mask for an aircraft occupant and said gas is oxygen, passage means connecting said inlet and said main outlet, normally closed main valve means in said passage means, and means for opening said main valve means in response to a predetermined difference between the pressure downstream from said third orifice and the pressure at said main outlet.

3. The device according to claim 2 wherein said means for opening said main valve means includes, a diaphragm having one side communicating with said main outlet and another side communicating with said pressure downstream from said third orifice, and a pilot valve movable to an open position in response to flexing of said diaphragm in one direction and operable when open to provide for opening of said main valve means.

4. An altitude sensing device comprising a body having an inlet, means forming a passage in said body communicating at one end with said inlet, first, second and third restricting orifices in series arrangement in said passage and arranged in sequence in a direction extending from said inlet, means forming an opening in said body communicating the portion of said passage between said first and second orifices with the ambient atmosphere, valve means at said opening for metering flow from said passage portion through said opening, means subjecting said valve means to a substantially constant closing force, said body having an exhaust opening downstream from said third orifice communicating with the ambient atmosphere, whereby on connection of said inlet to a gas supply at elevated pressure sufficient to maintain sonic flow through said restrictions, the difference between a control pressure existing between said second and third orifices and ambient pressure will increase as the ambient pressure decreases, a chamber located between said third orifice and said exhaust opening and communicating with said third orifice, and an exhaust valve member movable between open and closed positions and communicating said chamber and said exhaust opening in the open position thereof, said exhaust valve member in the closed position thereof discontinuing the communication between said chamber and said exhaust opening, said exhaust valve member being urged toward the closed position therefor by said control pressure.

5. In an oxygen pressure regulator which includes an inlet for oxygen under pressure, a main outlet adapted to be connected to breathing apparatus and a main valve operable when open to admit oxygen under pressure from said inlet to said main outlet, means for maintaining a pressure at said main outlet which is a function of the pressure of the ambient atmosphere comprising, passage means communicating at one end with said inlet, first, second and third restricting orifices in series arrangement in said passage means and arranged in sequence in a direction extending from said inlet, valve means communicating a portion of said passage means between said first and second orifices with the ambient atmosphere when said valve means is open, means applying a substantially constant closing force to said valve means, means providing an exhaust opening for said passage means downstream from said third orifice which communicates with the ambient atmosphere, an exhaust valve located between said third orifice and said exhaust opening for metering flow therebetween, said exhaust valve being positioned so that it is urged toward the closed position by the pressure in the portion of said passage means between said second and third orifices and urged toward an open position by the pressure in said passage means downstream from said third orifice so that as the pressure in said portion between said second and third orifices increases the pressure in said portion downstream from said third orifice is increased, diaphragm means exposed on one side to said pressure downstream from said third orifice and on the opposite side to pressure at said main outlet, and means responsive to movement of said diaphragm means when the pressure on said one side exceeds the pressure on the opposite side providing for opening said main valve.

6. An oxygen pressure regulator according to claim 5 wherein said last mentioned means includes pilot valve means and a lever connected thereto and positioned in engagement with said diaphragm means so as to open said pilot valve means in response to said movement of said diaphragm means.

7. An oxygen pressure regulator according to claim 5 further including means extending into said third orifice and adjustable relative thereto for controlling the extent of the restriction thereof in said passage means.

References Cited

UNITED STATES PATENTS 2,854,913   10/1958   Brahm _____ 98—1.5
2,884,905   5/1959   Jensen.

FOREIGN PATENTS 885,353   12/1961   Great Britain.

ROBERT G. NILSON, Primary Examiner

U.S. Cl. X.R.

73—384; 98—1.5